Oct. 6, 1964     A. SCUCCIMARRI     3,151,330

TOOLS FOR DRIVING THIN-WALLED METAL FERRULES

Filed Feb. 13, 1962     2 Sheets-Sheet 1

INVENTOR.
ANGELO SCUCCIMARRI
BY
Prangley, Baird, Clayton,
Miller & Vogel,
ATTYS.

INVENTOR.
ANGELO SCUCCIMARRI

United States Patent Office 3,151,330
Patented Oct. 6, 1964

3,151,330
TOOLS FOR DRIVING THIN-WALLED
METAL FERRULES
Angelo Scuccimarri, Riverdale, N.J., assignor to General
American Transportation Corporation, Chicago, Ill., a
corporation of New York
Filed Feb. 13, 1962, Ser. No. 172,892
2 Claims. (Cl. 1—47)

The present invention relates to tools for driving thin-walled metal ferrules into frictional engagement with the wall of a hole provided in a metal workpiece.

In the copending application of Simon S. Kahn, Serial No. 98,116, filed March 24, 1961, there are disclosed a strong threaded anchorage and a method of making the same that involve a workpiece formed of relatively soft compressible solid metal having a hole provided therein, and a fastening device in the form of a ferrule, the ferrule being formed of relatively hard metal characterized by plastic flow under swaging pressure. The ferrule is first driven into the hole provided in the workpiece and into frictional engagement with the wall thereof; and thereafter, the interior surface of the ferrule is subjected to swaging pressure utilizing an extremely hard metal thread-swaging member so as simultaneously to swage an internal thread upon the interior surface of the ferrule and to swage an external thread-like structure upon the exterior surface of the ferrule and to compress an internal thread-like structure upon the workpiece interiorly of the hole provided therein. In the arrangement, the thread-like structures mentioned are complementary and are disposed in interlocked frictional engagement with each other so as securely to anchor the ferrule in place in the hole provided in the workpiece. Subsequently, the thread-swaging member is removed from the interior of the ferrule and the internal thread formed therein is adapted to receive and to engage a cooperating external thread carried upon the shank of a metal screw, or the like, thereby to provide a strong threaded anchorage for the screw in the workpiece.

While this strong threaded anchorage and method of making the same are entirely satisfactory, in practice it has been discovered that substantial difficulty is encountered in driving the ferrule into frictional engagement with the wall of the hole provided in the workpiece without mutilating, or otherwise damaging, the ferrule in the driving step. This difficulty flows from the circumstance that the ferrule is normally formed of sheet metal of thin gauge and the ferrule has a length that is substantially greater than the external diameter thereof.

Accordingly, it is a general object of the present invention to provide a tool for driving a cooperating thin-walled metal ferrule into frictional engagement with the wall of a hole provided in an associated metal workpiece, without mutilation or damage to the ferrule in the driving step.

Another object of the invention is to provide a tool of the character described that is of simple and economical construction and arrangement.

Further features of the invention pertain to the particular construction and arrangement of the tool, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 8:
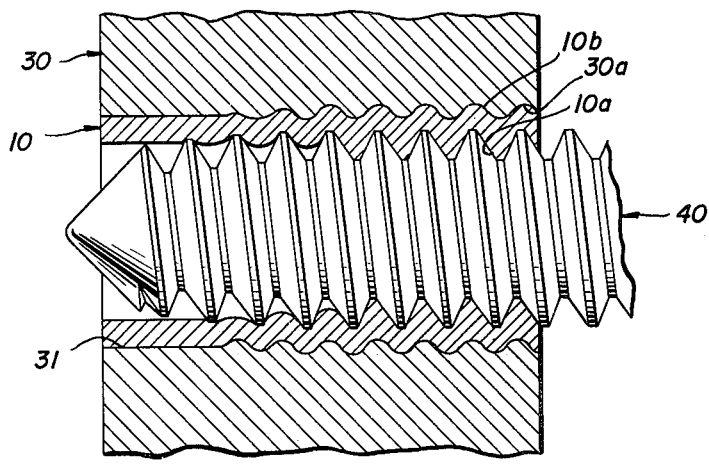
Figure 9:
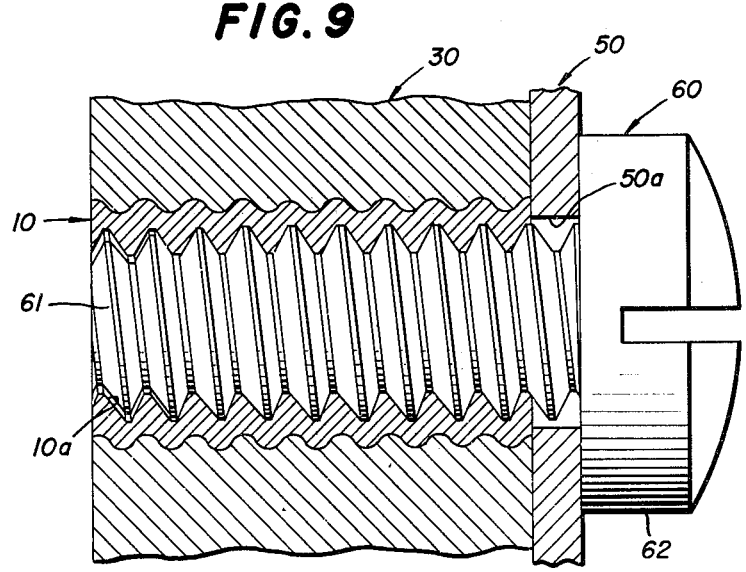

FIG. 8 is a greatly enlarged sectional view illustrating the subsequent swaging of the internal thread within the interior of the ferrule in the making of a threaded anchorage; and FIG. 9 is another greatly enlarged sectional view, similar to FIG. 8, illustrating the finally produced anchorage, including the workpiece and the ferrule, and an associated plate secured to the workpiece by a cooperating screw.

Referring now to FIGS. 1 to 7, inclusive, there is illustrated a tool 20 embodying the features of the present invention and especially adapted to drive a fastening element in the form of a thin-walled metal ferrule 10 into frictional engagement with the wall of a hole provided in a cooperating metal workpiece 30.

Figure 1:
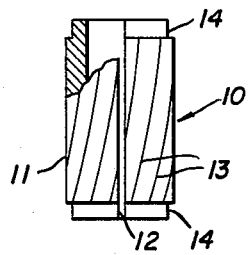
FIGURE 1 is a side elevational view of a thin-walled metal ferrule that is to be driven into a hole provided in an associated metal workpiece by a cooperating tool embodying the present invention.
Figure 2:
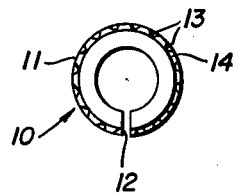
FIG. 2 is a top view of the ferrule, as shown in FIG. 1.
Figure 4:
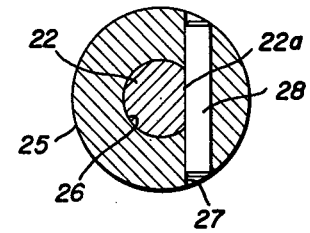
FIG. 4 is a horizontal sectional view of the tool, this view being taken in the direction of the arrows along the line 4—4 in FIG. 3.

More particularly, the ferrule 10 comprises, as shown in FIGS. 1 and 2, an elongated substantially cylindrical body or side wall 11 having an elongated slot 12 formed therein. The external surface of the side wall 11 carries a plurality of serrations 13 that are embedded into the wall of the hole in the cooperating workpiece incident to the driving of the ferrule 10 into frictional engagement therewith; and the opposite ends of the ferrule 10 are chamfered, as illustrated at 14, in order to facilitate the insertion of the front end of the ferrule 10 into the outer end of the cooperating hole provided in the associated workpiece. The ferrule 10 may be formed of sheet metal, such, for example, as the low carbon steel SAE 1010. The dimensions of the ferrule 10 are selected, depending upon the character of the workpiece, the dimensions of the screw or other fastener that is to be received within the ferrule 10 in the final strong anchorage that is produced utilizing the same, etc. However, ordinarily the ferrule has a length that is greater than the external diameter of the side wall 11 and is formed of sheet metal of relatively thin gauge.

Figure 3:
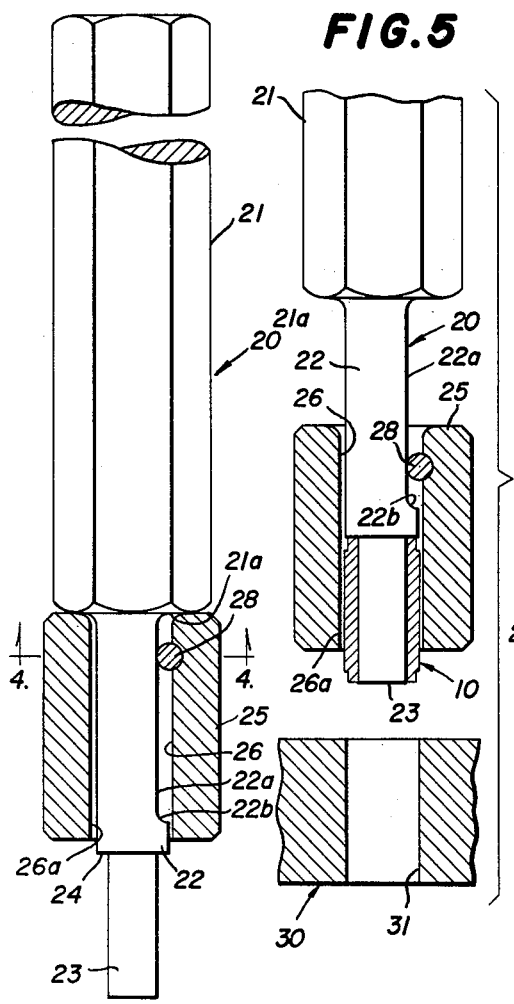
FIG. 3 is a fragmentary side elevational view, partly in section, of the tool for driving the ferrule of FIGS. 1 and 2 and embodying the present invention.
Figure 7:
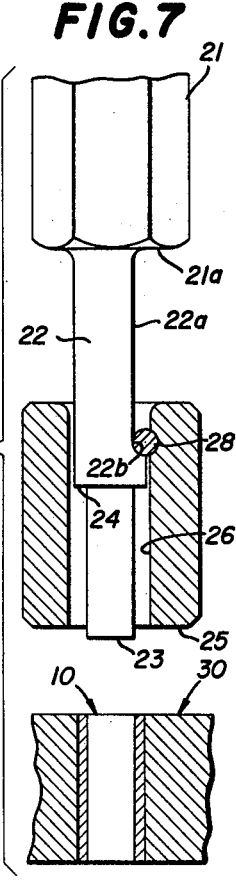
FIG. 7 is another fragmentary side elevational view, partly in section, similar to FIGS. 5 and 6, of the tool and illustrating the withdrawal of the tool from the ferrule subsequent to the driving of the ferrule into the hole provided in the associated workpiece.

More particularly, the tool 20 comprises, as shown in FIGS. 3 to 7, inclusive, an elongated handle 21 having a convenient configuration for easy handling, such, for example, as the hexagonal configuration illustrated. The front end of the handle 21 terminates in an elongated forwardly projecting shank 22, and the front end of the shank 22 terminates in an elongated forwardly projecting arbor 23. The elements 21, 22 and 23 are arranged in central longitudinal alignment with each other, and preferably these elements are forged integrally with each other from a suitable blank formed of steel. Both the shank 22 and the arbor 23 are substantially cylindrical, the diameter of the shank 22 being larger than that of the arbor 23 so as to provide a substantially annular shoulder or anvil 24 on the extreme front end of the shank 22 and surrounding the rear end of the arbor 23. Further, the tool 20 comprises a block 25 mounted upon the shank 22 for longitudinal sliding movements with respect thereto between a front position, as shown in FIG. 7, and a rear position, as shown in FIG. 3. More particularly, the block 25 is of substantially annular configuration having a centrally disposed opening 26 therein that receives the shank 22. Further the block 25 has a laterally extending opening 27 provided therethrough in offset relation with respect to the longitudinally extending central axis thereof; which opening 27 receives an associated substantially cylindrical pin 28 that is frictionally retained in place in the opening 27. One side of the shank 22 is milled-out to provide a flat surface 22a thereon that receives the pin 28, thereby to accommodate the previously mentioned longitudinal sliding movements of the block 25 with respect to the shank 22 while preventing relative rotational movements between the block 25 and the shank 22.

The handle 21 has a lateral dimension that is substantially larger than the diameter of the shank 22 in order that the shoulder 21a provided on the extreme front end of the handle 21 and in surrounding relation with respect to the rear end of the shank 22 constitutes a rear stop cooperating with the rear end of the block 25 so as positively to establish the previously mentioned rear portion of the block 25 with respect to the shank 22. The extreme front end of the milled-out side of the shank 22 terminates in a front stop 22b that cooperates with the pin 28 so as positively to establish the previously mentioned front position of the block 25 with respect to the shank 22. More particularly, when the block 25 occupies its rear position mentioned, as shown in FIG. 3, the rear end of the block 25 engages the rear stop 21a; and when the block 25 occupies its front position mentioned, as shown in FIG. 7, the pin 28 engages the front stop 22b.

Figure 5:
FIG. 5 is another fragmentary side elevational view, partly in section, of the tool of FIGS. 3 and 4, illustrating the cooperation therewith of the ferrule of FIGS. 1 and 2 and showing the associated workpiece having a hole into which the ferrule is to be driven.
Figure 6:
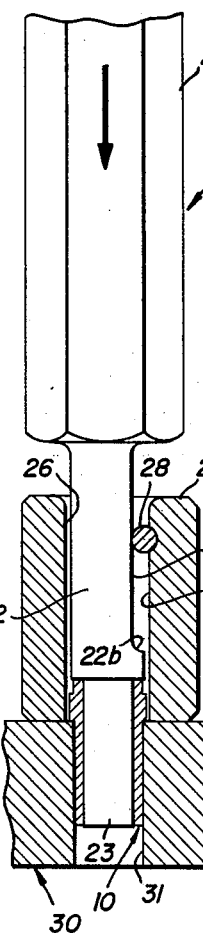
FIG. 6 is another fragmentary side elevational view, partly in section, similar to FIG. 5, of the tool and illustrating the driving of the ferrule into the hole provided in the associated workpiece.

The external diameter of the arbor 23 of the tool 20 is related to the internal diameter of the opening that is provided through the ferrule 10 so that the arbor 23 is adapted to be inserted into the opening mentioned and to support the ferrule 10 thereupon with the ferrule 10 in surrounding relation therewith; and the length of the arbor 23 is related to that of the ferrule 10 so that the rear end of the ferrule 10 engages the anvil 24 and the front end of the ferrule 10 terminates adjacent to the front end of the arbor 23, when the ferrule is in its supported position upon the arbor 23, as clearly illustrated in FIG. 5. The front portion of the longitudinally extending centrally disposed opening 26 that is provided through the block 25 constitutes a substantially cylindrical bore 26a provided in the front end of the block 25. The internal diameter of the bore 26a is related to the external diameter of the ferrule 10 so that the block is readily slidable over the ferrule 10 in its supported position upon the arbor 23, as clearly illustrated in FIGS. 5 and 6. More particularly, the wall of the bore 26a provided in the front portion of the block 25 supports the adjacent exterior surface of the ferrule 10 in its supported position upon the arbor 23, when the block 25 is in any position thereof forwardly of its rear position. The front end of the block 25 is disposed adjacent to and slightly rearwardly of the front end of the arbor 23, when the block 25 occupies its front position, as shown in FIG. 7; and the front end of the block 25 is disposed adjacent to and slightly rearwardly of the rear end of the arbor 23, when the block 25 occupies its rear position, as shown in FIG. 3.

As previously noted, the tool 20 is employed in driving or setting the ferrule 10 into frictional engagement with the wall of a hole provided in a cooperating workpiece; and, as illustrated in FIG. 5, the workpiece 30, has an elongated substantially cylindrical hole 31 formed therethrough into which the ferrule 10 is adapted to be driven by the tool 20. In the arrangement, the workpiece 30 is normally formed of a suitable relatively soft compressible metal, such, for example, as the aluminum alloys in the series: 2–S, 25–S, 52–S and 61–S.

Considering now the mode of operation of the tool 20, the block 25 is slid into its rear position, as shown in FIG. 3, and the ferrule 10 is fit over the arbor 23 and moved into its supported position upon the arbor 23, as shown in FIG. 5. At this time, the block 25 is slid into its front position, as shown in FIG. 7; whereby the bore 26a provided in the front end of the block 25 slides over the exterior surface of the ferrule 10 supporting the same. At this time, the extreme front end of the ferrule 10 terminates adjacent to the extreme front end of the arbor 23 and the extreme rear end of the ferrule 10 is in engagement with the anvil 24 at the junction between the front end of the shank 22 and the rear end of the arbor 23. Also, the front end of the block 25 in its front position terminates slightly rearwardly of the front end of the arbor 23 and the extreme front end of the ferrule 10 in its supported position upon the arbor 23. Accordingly, the extreme front end of the ferrule 10 may be readily inserted into the outer end of the hole 31 provided through the workpiece 30 with the extreme front end of the block 25 in engagement with the adjacent front surface of the workpiece 30. This insertion of the extreme front end of the ferrule 10 into the outer end of the hole 31 provided in the workpiece 30 is facilitated by the chamfer 14 that is provided about the extreme front end of the ferrule 10. At this time, the handle 21 is oriented with respect to the workpiece 30 so that the longitudinal axis thereof is substantially aligned with the longitudinal axis of the hole 31 provided in the workpiece 30. Then the handle 21 is moved forwardly toward the workpiece; which forward movement of the handle 21 may ordinarily be accomplished simply by pushing forwardly upon the handle 21; however, the extreme rear end of the handle 21 may be tapped with a mallet, or the like, to effect the forward movement mentioned of the handle 21 toward the workpiece 30. More particularly, as the handle 21 moves forwardly toward the workpiece 30, the shank 20 and the arbor 23 move therewith; and likewise, the ferrule 10 moves forwardly with respect to the workpiece 30 and thus forwardly into the hole 31 provided in the workpiece 30. As the ferrule 10 is thus driven forwardly into the hole 31 provided in the workpiece 30, the serrations 13 carried by the exterior surface of the side wall 11 are embedded into the wall of the hole 31 and the adjacent edges of the side walls 11 of the ferrule 10 are forced into abutting relation with each other so as to close the slot 12 formed in the side wall 11 of the ferrule 10. Also, incident to driving of the ferrule 10 into the hole 31 provided in the workpiece 30, the block 25 is slid rearwardly from its front position, as shown in FIG. 7, into its rear position, as shown in FIG. 3; whereby the bore 26a provided in the front portion of the block 25 supports the adjacent exterior surface of the ferrule 10 during the driving of the ferrule 10, as clearly illustrated in FIGS. 5 and 6. Also, during the driving of the ferrule 10, the interior surface thereof is directly supported by the arbor 23. Hence, during the driving of the ferrule 10, both the interior surface thereof and the exterior surface thereof are supported by the tool 20 so as to prevent damage thereto in the driving action. At the conclusion of the driving of the ferrule 10 into the hole 31 provided in the workpiece 30, the tool 20 may be readily withdrawn from the workpiece into the position, as shown in FIG. 7; whereby at this time, the ferrule 10 is frictionally secured in place within the hole 31 provided in the workpiece 30, as shown in FIG. 7.

Continuing with the previously mentioned Kahn method of making a threaded anchorage, after the ferrule 10 is frictionally secured in place in the hole 31 provided in the workpiece 30, the interior surface of the ferrule 10 is subjected to swaging pressure, in the general manner illustrated in FIG. 8 and utilizing an extremely hard metal thread-swaging member 40 that may be of the construction and arrangement of that disclosed in U.S. Reissue Patent No. 24,572, granted on December 2, 1958 to Donald P. Welles, Jr. More particularly, this thread-swaging member or tap 40 is inserted into the outer end of the ferrule 10 and then pressed home and rotated; whereby the interior surface of the ferrule 10 is subjected to swaging pressure so as simultaneously to swage an internal thread 10a upon the interior surface of the ferrule 10 and to swage an external thread-like structure 10b upon the exterior surface of the ferrule 10 and to compress an internal thread-like structure 30a upon the workpiece 30 interiorly of the hole 31; wherein the thread-like structures 10b and 30a are complementary and disposed in interlocked frictional engagement with each other so as securely to anchor the ferrule 10 in place in the hole 31 provided in the workpiece 30. After threading of the interior of the ferrule 10, the tap 40 is removed from engagement with the internal thread 10a; whereby a strong threaded anchorage is provided.

More particularly, as illustrated in FIG. 9, an external plate 50 may be secured or fastened to the workpiece 30, utilizing a conventional machine screw 60, the machine screw 60 including a threaded shank 61 and being provided with an enlarged head 62 adjacent to the rear end thereof. In the arrangement, as illustrated in FIG. 9, the plate 50 is disposed in contact with the adjacent surface of the workpiece 30 and is secured in place by the screw 60, the shank of the screw 61 passing through a cooperating opening 50a provided through the plate 50. Specifically, the threaded shank 61 engages the internal thread 10a carried upon the interior surface of the ferrule 10, and the head 62 engages the adjacent surface of the plate 50, thereby retaining the plate 50 in assembled relation with respect to the workpiece 30 and providing the secure connection therebetween.

In view of the foregoing, it will be understood that the ferrule 10 and the tool 20 are suitably constructed with related dimensions so as to facilitate ready driving of a great plurality of ferrules 10 successively by the tool 20 into corresponding holes 31 provided in the same or different workpieces, as required. Also, it will be appreciated that the utilization of the tool 20 greatly facilitates rapid driving of the ferrules 10 in a simple and economical manner without damage thereto that would be most objectionable in the subsequent production of threaded anchorages in the manner as described above. Moreover, the tool 20 is of simple and economical construction and arrangement so that it is altogether economical to provide one of the tools 20 individual to each size and configuration of the ferrules 10.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A tool for driving an elongated substantially cylindrical thin-walled metal ferrule into frictional engagement with the elongated substantially cylindrical wall of a hole provided in a metal workpiece, wherein the ferrule has a length substantially greater than the diameter thereof; said tool comprising an elongated shank, an elongated forwardly projecting substantially cylindrical arbor carried by the front end of said shank and having a length that is substantially greater than the diameter thereof, a shoulder arranged between the front end of said shank and the rear end of said arbor providing a substantially annular anvil, the external diameter of said arbor being related to the internal diameter of the opening provided through the metal ferrule so that said arbor is adapted to be inserted into the opening mentioned and to support the metal ferrule thereupon with the metal ferrule in surrounding relation therewith, the length of said arbor being related to that of the metal ferrule so that the rear end of the metal ferrule engages said anvil and the front end of the metal ferrule terminates adjacent to and somewhat rearwardly of the front end of said arbor when the metal ferrule is in its supported position upon said arbor, a block carried by said shank and mounted thereupon for longitudinal sliding movements with respect thereto, and a pair of longitudinally spaced-apart stop means for positively establishing a front position of said block with respect to said shank and a rear position of said block with respect to said shank, the front end of said block being disposed adjacent to and somewhat rearwardly of the front end of said arbor when said block occupies its front position and the front end of said block being disposed adjacent to and somewhat rearwardly of the rear end of said arbor when said block occupies its rear position, said block having a substantially cylindrical bore in the front portion thereof, the internal diameter of said bore being related to the external diameter of the metal ferrule so that said block is readily slidable over the metal ferrule in its supported position upon said arbor and so that said block in any position thereof disposed forwardly of its rear position supports the adjacent exterior surface of the metal ferrule in its supported position upon said arbor, whereby the front end of the metal ferrule in its supported position upon said arbor may be inserted into the outer end of the hole provided in the metal workpiece and simultaneously the front end of said block in its front position may engage the adjacent surface of the metal workpiece, and whereby thereafter said shank may be moved toward the metal workpiece to cause said anvil to drive the metal ferrule into frictional engagement with the wall of the hole provided in the metal workpiece and to cause said block to slide from its front position into its rear position with the result that the interior surface of the metal ferrule is supported by said arbor and the exterior surface of the metal ferrule is supported by said block during the driving movement of the metal ferrule into frictional engagement with the wall of the hole provided in the metal workpiece.

2. The tool set forth in claim 1, and further comprising means cooperating between said shank and said block for preventing relative rotation therebetween while accommodating the sliding movements of said block with respect to said shank between its front position and its rear position.

References Cited in the file of this patent

UNITED STATES PATENTS 1,618,889     Ruping _____ Feb. 22, 1927

FOREIGN PATENTS 35,454     Norway _____ Aug. 7, 1922
362,518     France _____ Apr. 7, 1906